United States Patent
Zander

(10) Patent No.: US 10,521,215 B2
(45) Date of Patent: Dec. 31, 2019

(54) TECHNOLOGIES FOR CUSTOMIZED CROWD-SOURCED FEATURES, AUTOMATED SAFETY AND QUALITY ASSURANCE WITH A TECHNICAL COMPUTING ENVIRONMENT

(71) Applicant: Intel Corporation, Santa Clara, CA (US)

(72) Inventor: Justyna Zander, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 15/372,979

(22) Filed: Dec. 8, 2016

(65) Prior Publication Data

US 2017/0168809 A1 Jun. 15, 2017

Related U.S. Application Data

(60) Provisional application No. 62/265,936, filed on Dec. 10, 2015.

(51) Int. Cl.
*G06F 8/65* (2018.01)
*G06F 8/35* (2018.01)

(52) U.S. Cl.
CPC . *G06F 8/65* (2013.01); *G06F 8/35* (2013.01)

(58) Field of Classification Search
CPC .................................... G06F 8/35; G06F 8/65
USPC ........................................................ 717/168
See application file for complete search history.

(56) References Cited

U.S. PATENT DOCUMENTS

| | | | |
|---|---|---|---|
| 8,380,880 B2* | 2/2013 | Gulley | G06F 9/5027 709/217 |
| 9,508,200 B1* | 11/2016 | Mullen | G07C 5/008 |
| 9,606,539 B1* | 3/2017 | Kentley | G05D 1/0214 |
| 9,697,503 B1* | 7/2017 | Penilla | G06Q 10/20 |
| 2011/0131162 A1* | 6/2011 | Kaushal | G05B 13/0265 706/13 |
| 2014/0089521 A1* | 3/2014 | Horowitz | H04L 67/02 709/239 |

(Continued)

OTHER PUBLICATIONS

Razdan et al., "Empirical Results from the Transformation of a Large Commercial Technical Computing Environment", IEEE, 2009, 9pg. (Year: 2009).*

*Primary Examiner* — Ryan D. Coyer
(74) *Attorney, Agent, or Firm* — Barnes & Thornburg LLP

(57) ABSTRACT

Technologies for customized crowd-sourced update and validation include a computing device having a technical computing environment (TCE)-based engine that receives user information from one or more user devices, executes a TCE model with the user information to generate behavior data of the TCE model, and generates a software update for the TCE model based on the behavior data. The TCE model may be a model for an autonomous system such as a self-driving vehicle, and the software update may be a safety update for the autonomous vehicle. The user information may include sensor data, such as distance detection sensor data. The computing device may transmit an incentive such as a software update, feature update, or safety software update to the user devices. The computing device may also receive information associated with the TCE model from one or more developer devices. Other embodiments are described and claimed.

23 Claims, 13 Drawing Sheets

(56) References Cited

U.S. PATENT DOCUMENTS

2014/0280316 A1\* 9/2014 Ganick ............ G06F 17/30522
707/769
2016/0362084 A1\* 12/2016 Martin .................... B60R 25/00
2017/0132934 A1\* 5/2017 Kentley ................ G08G 1/202

\* cited by examiner

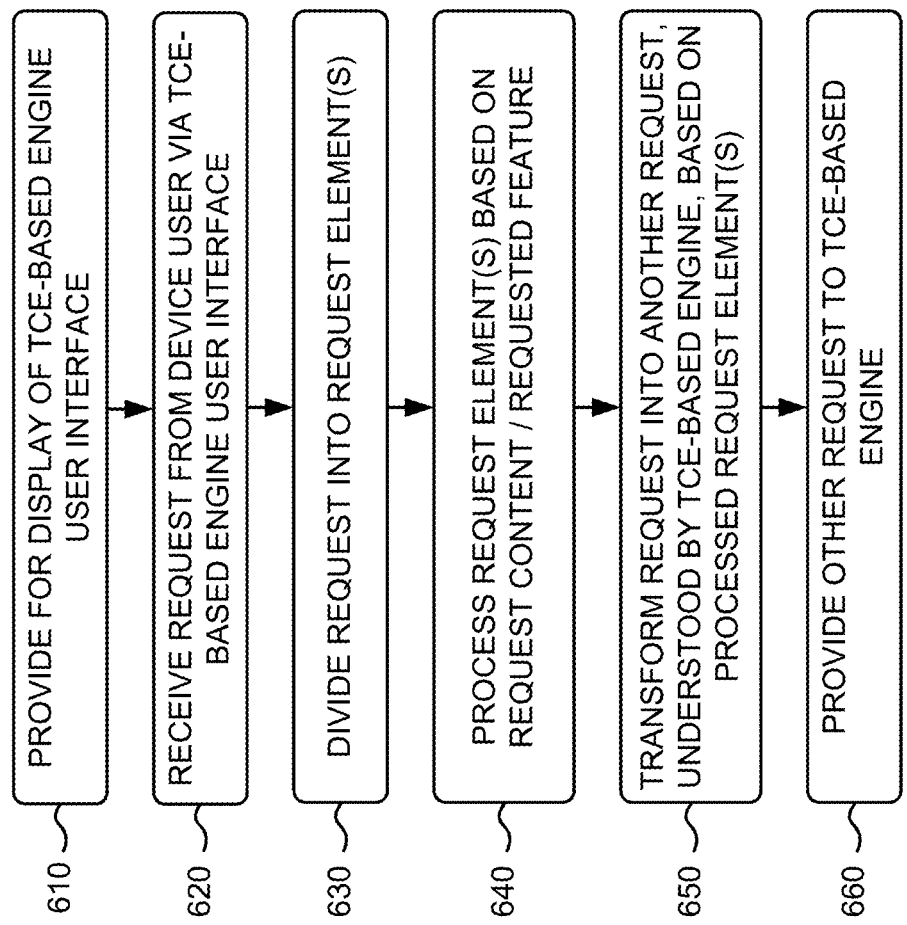

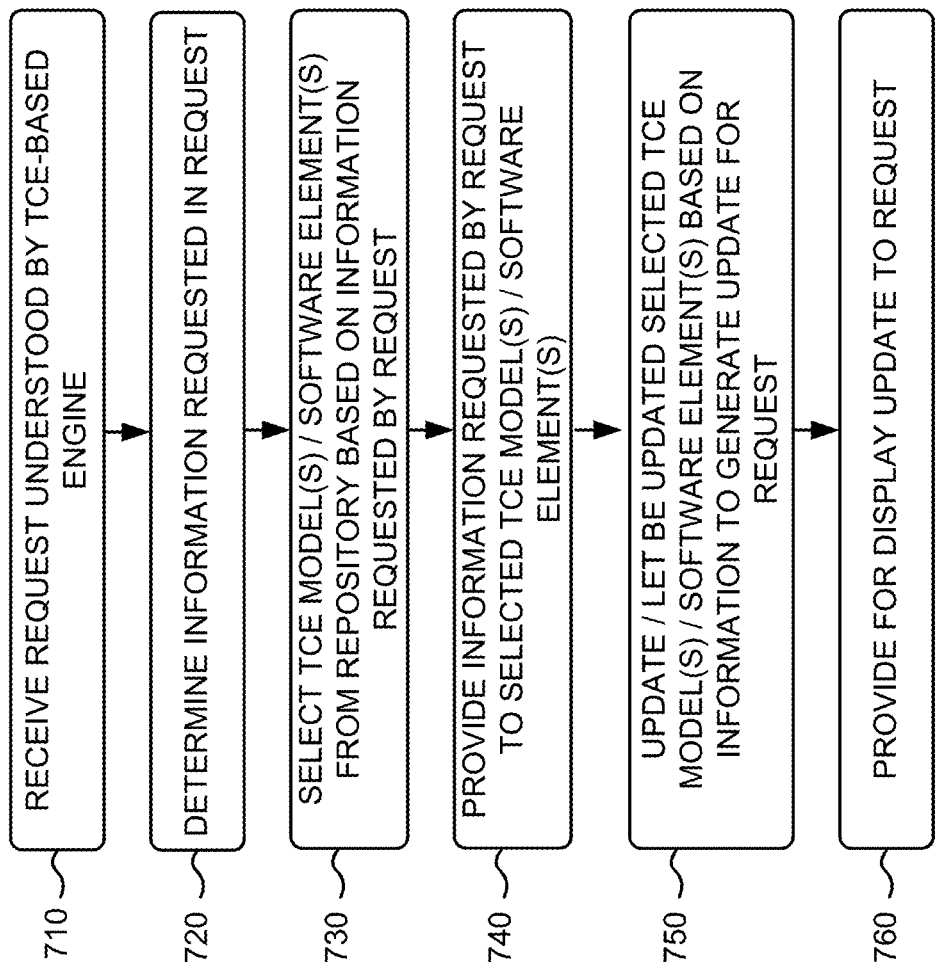

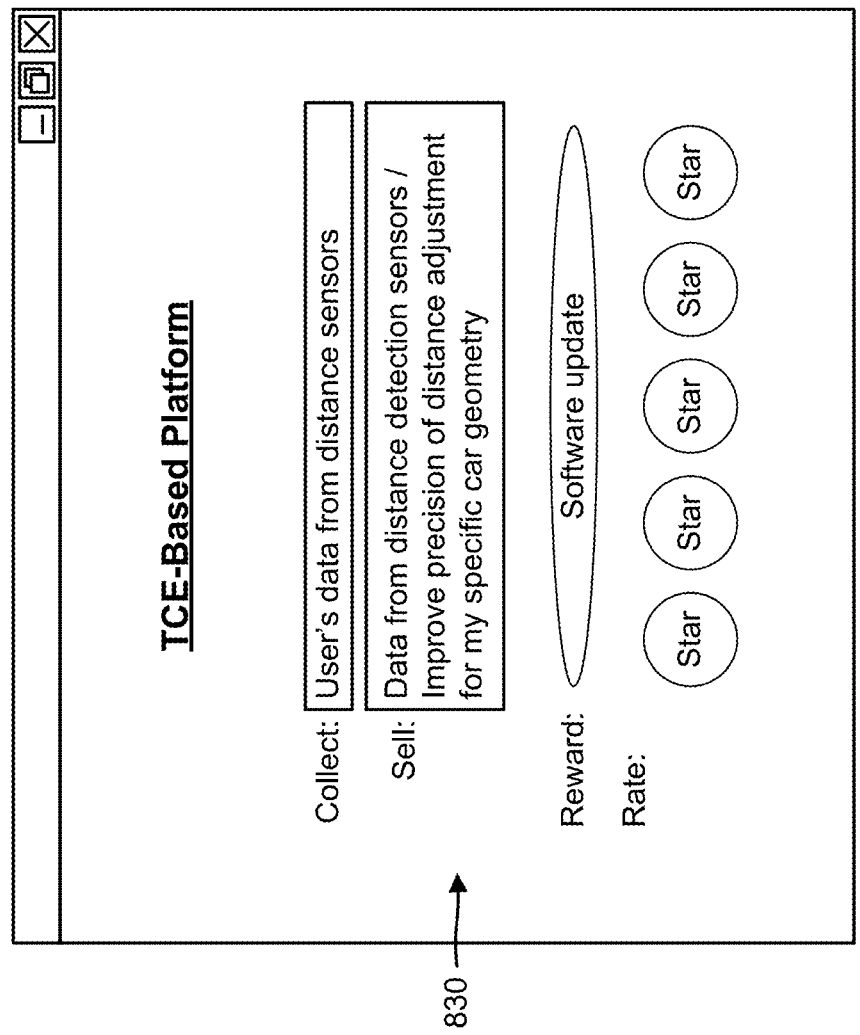

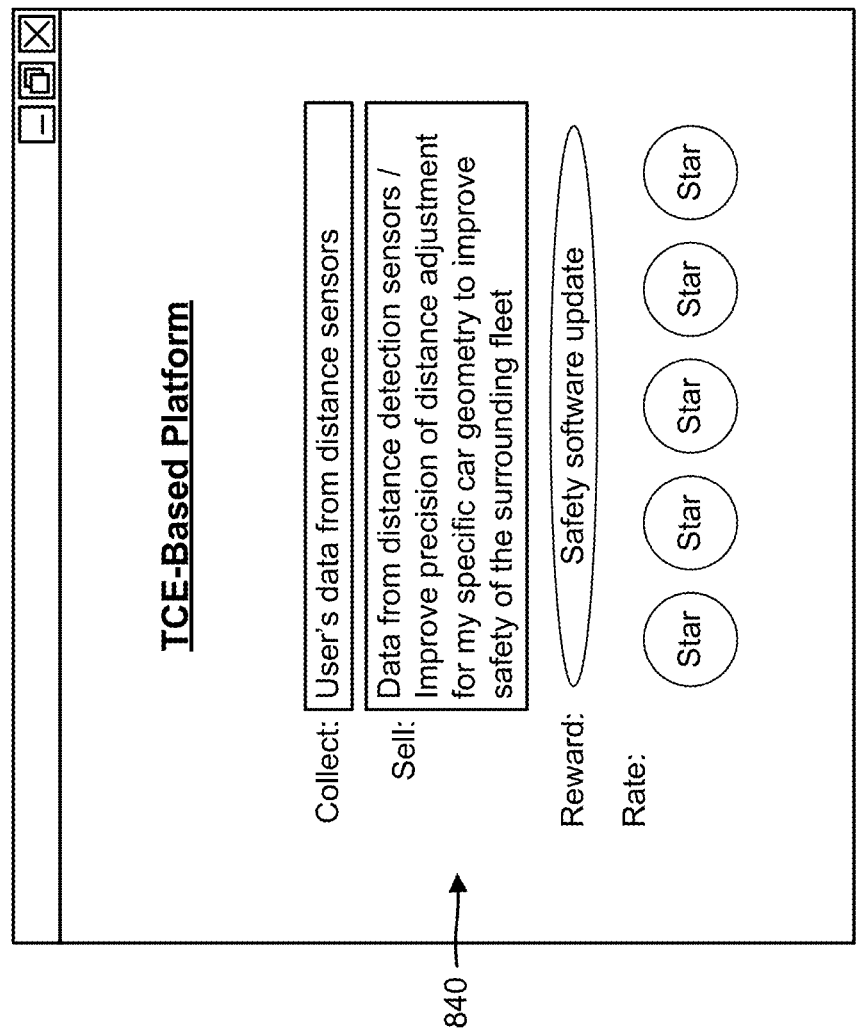

TECHNOLOGIES FOR CUSTOMIZED CROWD-SOURCED FEATURES, AUTOMATED SAFETY AND QUALITY ASSURANCE WITH A TECHNICAL COMPUTING ENVIRONMENT

CROSS-REFERENCE TO RELATED APPLICATION

The present application claims priority under 35 U.S.C. § 119(e) to U.S. Provisional Patent Application Ser. No. 62/265,936, entitled "USE OF A TECHNICAL COMPUTING ENVIRONMENT FOR DEVELOPING CUSTOMIZED CROWD-SOURCED FEATURES, AUTOMATED SAFETY AND QUALITY ASSURANCE (crowd-based testing, crowd-based validation, self-driving, safety, autonomous devices)," which was filed on Dec. 10, 2015.

BACKGROUND

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, the TCE may include a dynamically-typed programming language (e.g., the M language, a MATLAB® language, a MATLAB-compatible language, a MATLAB-like language, etc.) that can be used to express problems and/or solutions in mathematical notations. The TCE may use an array, a vector, and/or a matrix as basic elements.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a flow chart of an example process for transforming a feature request of a device user into a format understood by the TCE-based engine;

FIG. 7 is a flow chart of an example process for providing software update to a feature request using the TCE-based engine; and FIGS. 8A-8C are diagrams of an example of the process described in connection with FIG. 7.

DETAILED DESCRIPTION OF THE DRAWINGS

Figure 1:
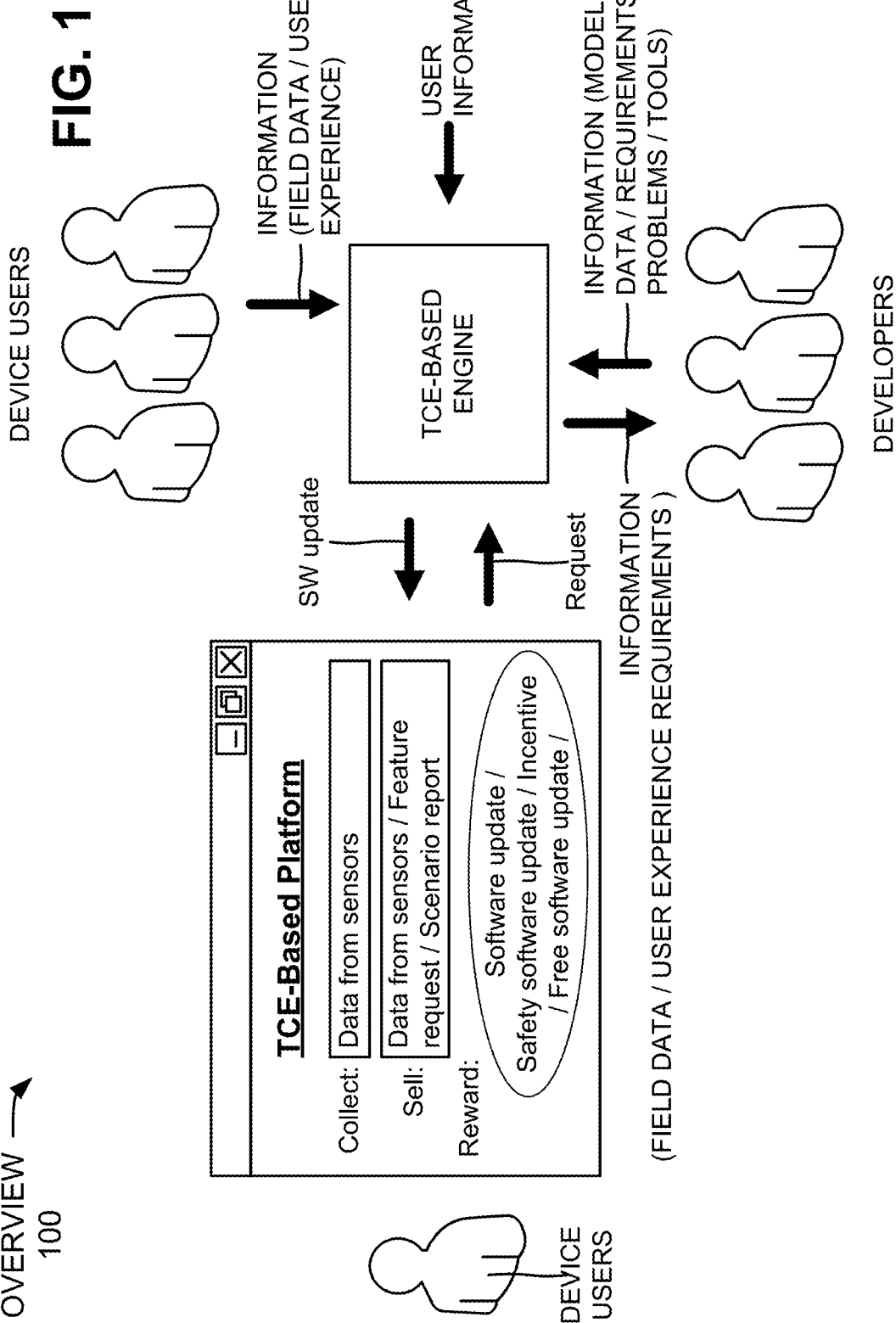
FIG. 1 is a diagram of an overview of an example implementation described herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Systems and/or methods described herein may provide a technical computing environment (TCE)-based platform that may provide a service for device users; a software update in response to a feature request; user/device authentication, verification, sorting, and/or evaluation; a development environment for system and/or safety development (e.g., automatic car pilot, self-driving car, autonomous fleet, etc.) such as, TCE-based engine; and/or automated metrics measurement. The TCE-based engine may be collaboratively created and improved by developers via a collaborative environment. The TCE-based engine may provide a software update, safety update, incentive, and/or other rewards to a feature request based on modeling, analysis, development, simulation, forecasting, and/or prediction of the feature implementation in the TCE. The TCE-based engine may be provided within a network (e.g., a social network, a professional network, etc.) that serves as an exchange for developers to share information and to provide information to the TCE-based engine.

In order to enable customized use of a TCE, TCE software may be embedded in another TCE-like environment of a similar nature, such as, for example, internet-based visualization embodiment. The internet-based visualization embodiment may be a geographical information system that may include geographical data in the form of longitude, latitude, attitude, and/or other variables. The original TCE may be applied in the background of the visualization environment in order to enable the use of both of them at the same time for the same and/or for different purposes.

In order to enable the use of the original TCE for crowd-validation, the end-user may be incentivized with various means to perform action in the visualization environment. For example, the end user may be encouraged by various methods to deploy the functionality of the TCE through using the visualization environment. As another example, the methods included in the incentives may comprise textual and/graphical information in 2 and/or 3 dimensions displayed and/or played with audio to the user.

The user may use the visualization environment without the need and/or necessity to know that the TCE functionality is hidden behind this visualization. The user may or may not be aware of the purpose of the user's action, given that they serve a positive goal. For example, the user may use a simulator's flying and/or simulator's driving mechanism in order to move from one location to another in the visualization environment while the user may then perform a validation of certain functionalities hidden behind this simulation.

The procedure of crowd-validation may refer to the notion of human computation, where a human action is used to perform an action that is requested and analyzed by a computer. Human computation may also be referred to as human-based computation, human-assisted computation, ubiquitous human computing, and/or distributed thinking. It may be understood as a computer science technique in which a machine performs its function by outsourcing certain steps to humans. Human computation may use differences in abilities and alternative costs between humans and computer agents to achieve symbiotic human-computer interaction. It may reverse the roles of a typical understanding of human and machine interaction. It may be based on the mechanism that the computer may ask a person or a large group of people to solve a problem, and then collects, interprets, and integrates their solutions. The procedure of crowd-validation may be related to validating the functional safety of the devices that may take part in the simulator's action (e.g., driving, flying, jumping, dancing, swimming, running, etc.) within the TCE.

In order to achieve the environment that allows the crowd-validation to be performed, a computational model of the simulator's action may be provided to the TCE behind the scenes of the visualization environment. The computational model may include a system (e.g., a device, object, human, at least one element and/or part of thereof) that may be comprised of an architecture, and/or behavior, and/or data, and/or control.

FIG. 1 is a diagram of an overview of an example implementation described herein. For the overview, assume that a computer device includes a TCE-based engine. One or more developers (e.g., model developers, tool developers, engineers, scientists, etc.) may provide information to the TCE-based engine of the device. For example, the developers may provide information associated with TCE models, data, requirements, problems (e.g., self-driving scenario including unidentified yet moving object in front and back of the car), and/or tools (e.g., safety tools) to the TCE-based engine. The TCE models may include any model capable of being provided to a TCE, as described herein. The data may include information available from the Internet and/or secure or insecure instances of the cloud computing and/or databases that may be analyzed in a TCE. The problems may include information that defines problems, such as, for example, questions, issues, subjects, topics, scenarios, etc. The tools may include any tool capable of being provided to a TCE, as described herein. As further shown in FIG. 1, the TCE-based engine may receive device user information associated with using the device (e.g., functionalities, features, etc.). The device user information may include user profiles, user locations, etc.

Figure 2:
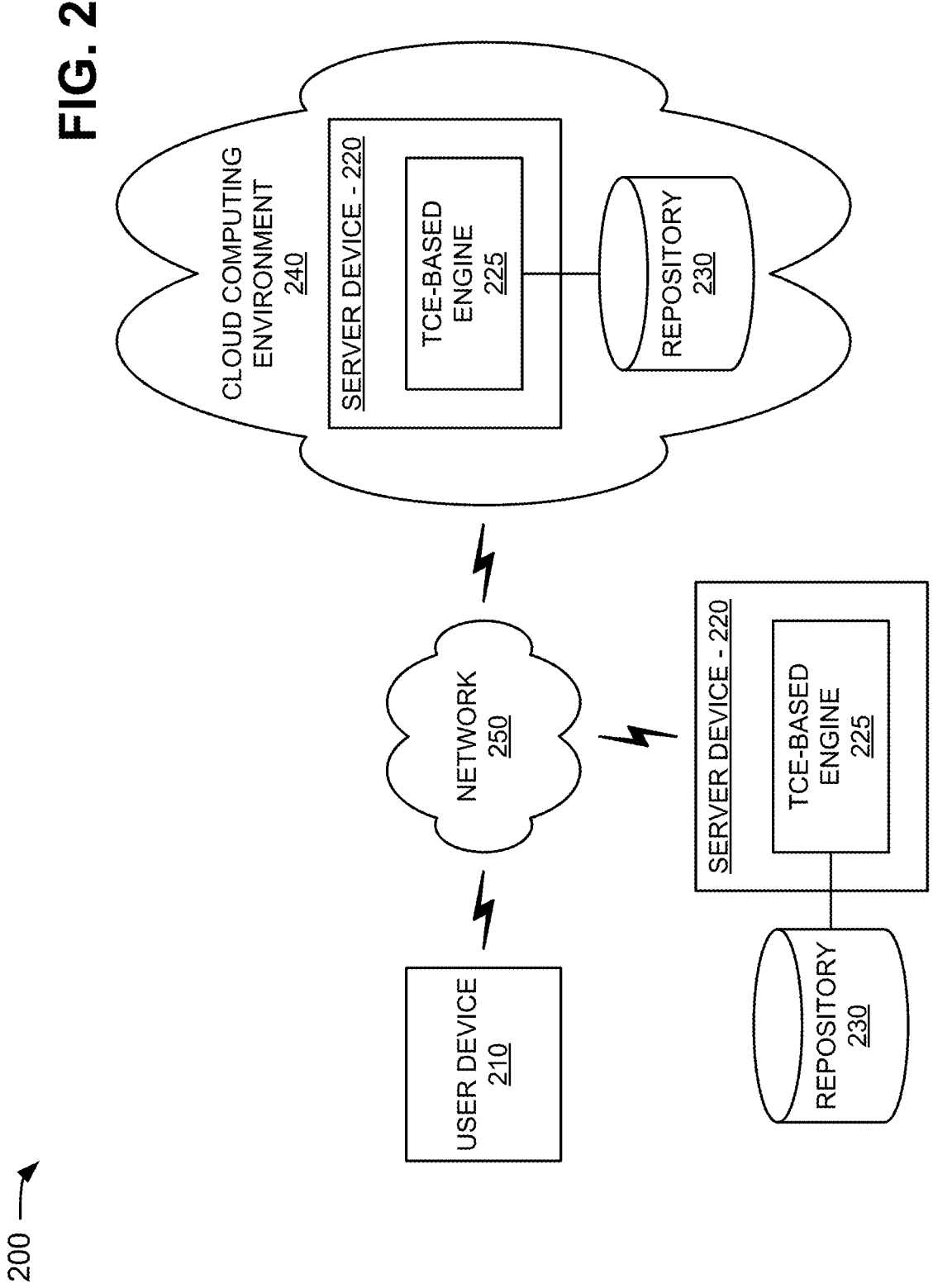
FIG. 2 is a diagram of an example environment in which systems and/or methods described herein may be implemented.

In some implementations, the device may execute the TCE models and/or the tools to determine behavior information associated with the TCE models and/or the tools. The device may store the received information and/or the behavior information in a repository and/or virtual instance and/or cloud-based instance associated with the TCE-based engine as shown in FIG. 2. The device may generate the TCE-based update based on the information stored in the repository.

Figure 8A:
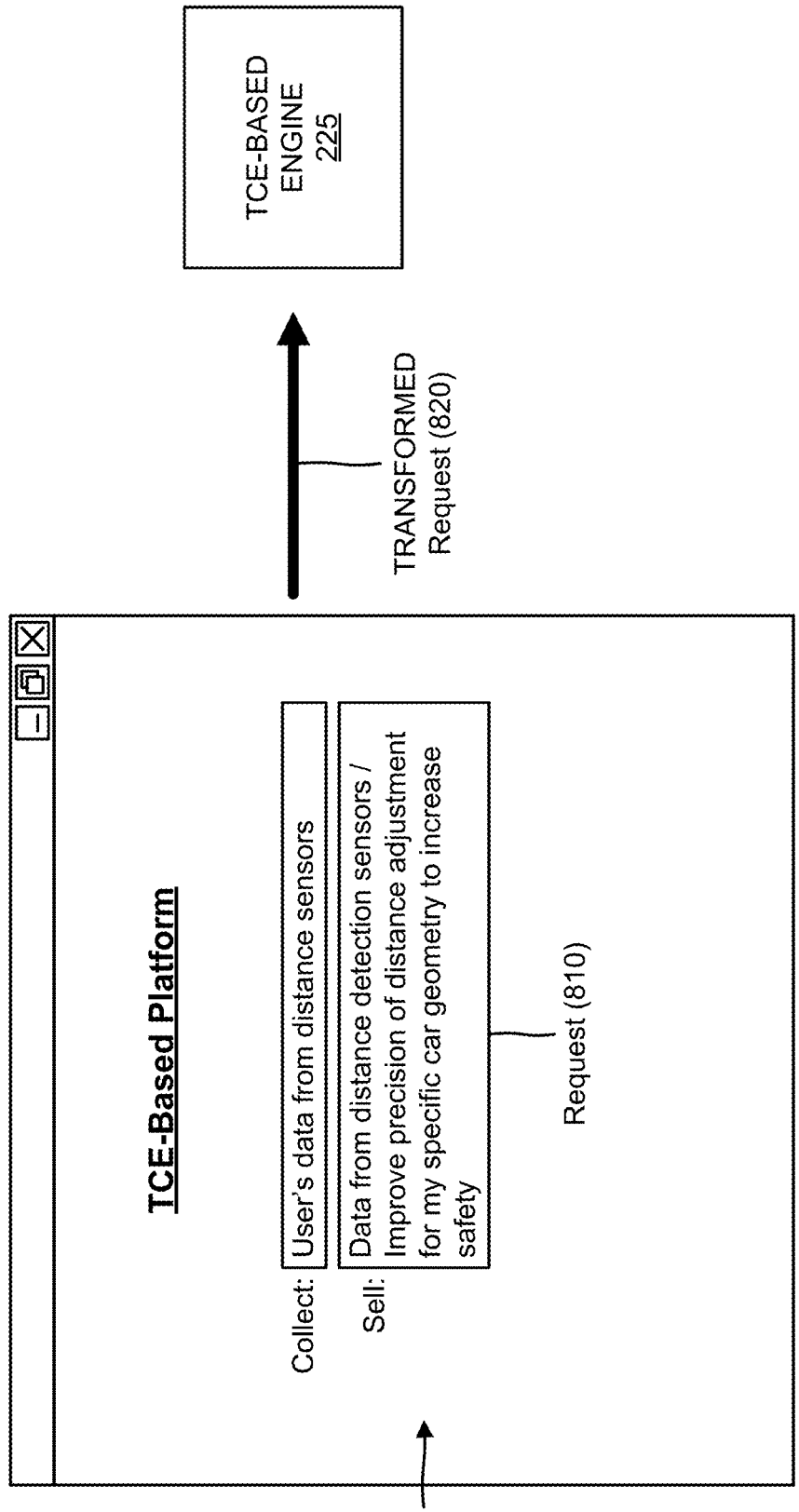

As further shown in FIG. 1, the device may provide for display of a TCE-based platform and/or a TCE-based engine user interface. The TCE-based engine user interface may be displayed to a developer. The TCE-based platform user interface may be displayed to a user, and the user may provide data from sensors, feature requests, scenario reports, etc. to the device via the TCE-based platform user interface. For example, assume that the device user allows the data to be collected from the sensors of his device and inputs a request: "Improve precision of distance adjustment for my specific car geometry to improve safety of the surrounding fleet" as the feature request. The example is illustrated in FIGS. 8A-8C. The device may receive the request, and may divide the request query into one or more request elements (e.g., words, phrases, features categories, architecture assignments, components, etc.). The device may process the request element(s) based on content, requested feature, data from the sensors, other data, model(s), model execution result(s), etc. associated with the request. The device may transform the request into another request, understood by the TCE-based engine, based on the processed request element(s), and may provide the other request to the TCE-based engine as illustrated in FIGS. 6 and 7.

In some implementations, the TCE-based engine may receive the other request, and may provide feature implementation update using the information and/or data provided by the other request. The TCE-based engine may select one or more TCE models from the repository based on the information provided with the other request, and may provide the information requested by the other query to the selected TCE model(s). The device may execute the selected TCE model(s), based on the information and/or data provided with the other request, to generate an update to the other request, and thus, the initial request. The device may provide the answer, update, software update, and/or system update to the request for display to the device user. For example, as shown in FIG. 1, the device may provide for display an information on the update as the answer to the request.

Such an arrangement may provide a TCE-based engine that generates updates of software, system, and/or safety features in response to a customized user request. The TCE-based platform and/or TCE-based engine may generate such updates based on information (e.g., models, data, problems, tools, etc.) provided to a TCE by users and/or developers. The TCE-based engine may enable the developers to add and/or modify tools, metrics, and/or information that may improve the performance of the TCE-based engine. For example, the developers may add and/or improve model design environments, models, tools, input data, parameters, etc. to achieve a more comprehensive analysis, a multidisciplinary analysis, and/or a solution to a device user request.

A collaborative environment, as described herein, may include an environment where people (e.g., developers) and/or computer agents may add TCE model information, TCE tool information, TCE data, user information, agent information, problem information, etc. to a repository. In some implementations, the collaborative environment may receive the aforementioned information via a plurality of interfaces (e.g., user interfaces, application programming interfaces (APIs), etc.). The collaborative environment may include an environment where people can add data, requests, features, requirements, and/or models on their own accord and/or the data, requests, features, requirements, models may be added by automatic agents (e.g., using machine learning, deep learning algorithms, automatically adjusted, detected, and discovered models, etc.). In some implementations, the collaborative environment may be constituted by the TCE-based engine or the content to which the TCE-based engine has access.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

A document, as the term is used herein, is to be broadly interpreted to include any machine-readable and machine-storable work product. A document may include, for example, an e-mail, a file, a combination of files, one or more files with embedded links to other files, a news group posting, a blog, a web advertisement, a Uniform Resource Locator (URL), etc. In the context of the Internet, a common document is a web page. Web pages often include textual information and may include embedded information (such as meta information, images, hyperlinks, etc.) and/or embedded instructions (such as Javascript, etc.). A document may also include a model, a set of models, an abstraction, an abstract representation, etc.

Referring now to FIG. 2, a diagram of an example environment 200 in which systems and/or methods described herein may be implemented is shown. As illustrated, the environment 200 may include a user device 210 interconnected with a server device 220, a repository 230, and/or a cloud computing environment 240, via a network 250. The server device 220 may include a TCE-based engine 225, and the cloud computing environment 240 may include the server device 220 (e.g., with a TCE-based engine 225) and the repository 230. Components of the environment 200 may interconnect via wired and/or wireless connections.

User device 210 may include one or more devices that are capable of communicating with server device 220 via network 250. For example, user device 210 may include a laptop computer, a personal computer, a tablet computer, a desktop computer, a workstation computer, a smart phone, a personal digital assistant (PDA), and/or other computation devices.

Server device 220 may include one or more server devices, or other types of computation and communication devices. Server device 220 may include a device that is capable of communicating with user device 210 (e.g., via network 250). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 225 and may perform some or all of the functionality described herein for user device 210.

TCE-based engine 225 may include an engine provided within a TCE. The TCE and TCE-based engine 225 may be provided within a computer-readable medium of server device 220 and may be accessible by user device 210. TCE-based engine 225 may enable developers to collaboratively perform engineering tasks, computational modeling, analysis, dynamic analysis, behavioral analysis, coding, code autogeneration, development, simulation, etc. with one or more model design environments that may include, for example, tools, logic, source code, engines, etc.

The TCE may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, the TCE may include a dynamically-typed programming language (e.g., the M language, a MATLAB® language, a MATLAB-compatible language, a MATLAB-like language, etc.) that can be used to express problems and/or solutions in mathematical notations.

For example, the TCE may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

In some implementations, the TCE may include other technical means that allow for applying select programming languages and/or using existing application programming interfaces. These interfaces may link to other engines.

The TCE may further provide mathematical functions and/or graphical tools (e.g., for creating plots, surfaces, images, volumetric representations, etc.). In some implementations, the ICE may provide these functions and/or tools using toolboxes (e.g., toolboxes for signal processing, image processing, data plotting, parallel processing, etc.). In some implementations, the TCE may provide these functions as block sets or in another way, such as via a library, etc.

The TCE may be implemented as a text-based environment (e.g., MATLAB software; Octave; Python; Julia; R; Scala; OpenCL; OpenVX; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

The TCE may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as the TCE. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically typed array-based computing language, data may be represented by arrays and data types of data may be determined at run-time.

The TCE may provide mathematical routines and a high-level programming language suitable for non-professional programmers and may provide graphical tools that may be used for creating plots, surfaces, images, volumetric representations, or other representations. The TCE may provide these routines and/or tools using toolboxes (e.g., toolboxes for signal processing, image processing, data plotting, parallel processing, etc.). The TCE may also provide these routines in other ways, such as, for example, via a library, a local or remote database (e.g., a database operating in a computing cloud), remote procedure calls (RPCs), and/or an application programming interface (API). The TCE may be configured to improve runtime performance when performing computing operations. For example, the TCE may include a just-in-time (JIT) compiler.

The TCE may include a modeling system that may be used in the creation of a functional model and that may enable generation of executable code based on the model. For example, the TCE may include a graphical modeling tool or application that provides a user interface for a numerical computing environment. Additionally, or alternatively, the TCE may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally or alternatively, a graphical model may have executable semantics and/or may be executable. An executable graphical model may be a time based block diagram. A time based block diagram may include, for example, blocks connected by lines (e.g., connector lines). The blocks may represent elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may include meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. Additionally, or alternatively, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively or additionally, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Still referring to FIG. 2, the repository 230 may include a single memory device or multiple (possibly distributed) memory devices. Repository 230 may store various types of information associated with models, data, problems, tools, etc. implemented by the TCE; information associated with collaborating device users; information associated with simulations, such as dynamic system models, parameters, initial state, input values, etc.; information associated with static analysis methods (e.g., abstract interpretation, model checking, etc.); etc.

Cloud computing environment 240 may include an environment that delivers computing as a service, whereby shared resources, services, user objects, etc. may be provided to user device 210 as a utility over a network. Cloud computing environment 240 may provide computation, software, data access, and/or storage services that do not require end-user (e.g., user device 210) knowledge of a physical location and configuration of system(s) and/or device(s) that deliver the services. In some implementations, cloud computing environment 240 may include server device 220, TCE-based engine 225, and repository 230. In some implementations, cloud computing environment 240 may be provided in lieu of the standalone server device 220/repository 230. In some implementations, the standalone server device 220/repository 230 may be provided in lieu of cloud computing environment 240.

Network 250 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Figure 3:
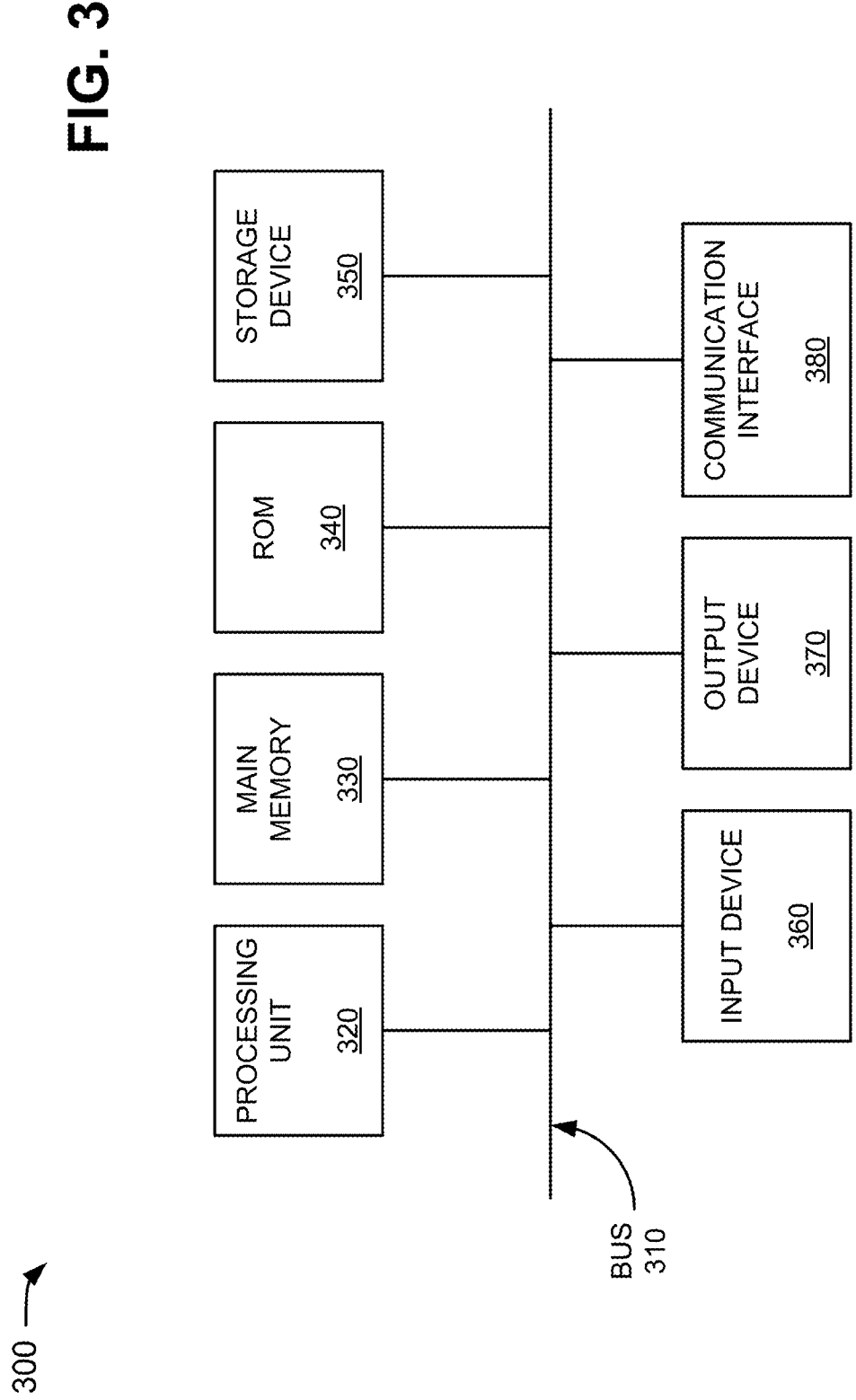
FIG. 3 is a diagram of example components of one or more of the devices of the environment depicted in FIG. 2.

Referring now to FIG. 3, a diagram of a device 300 that may correspond to one or more of the devices of environment 200 is shown. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to the processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
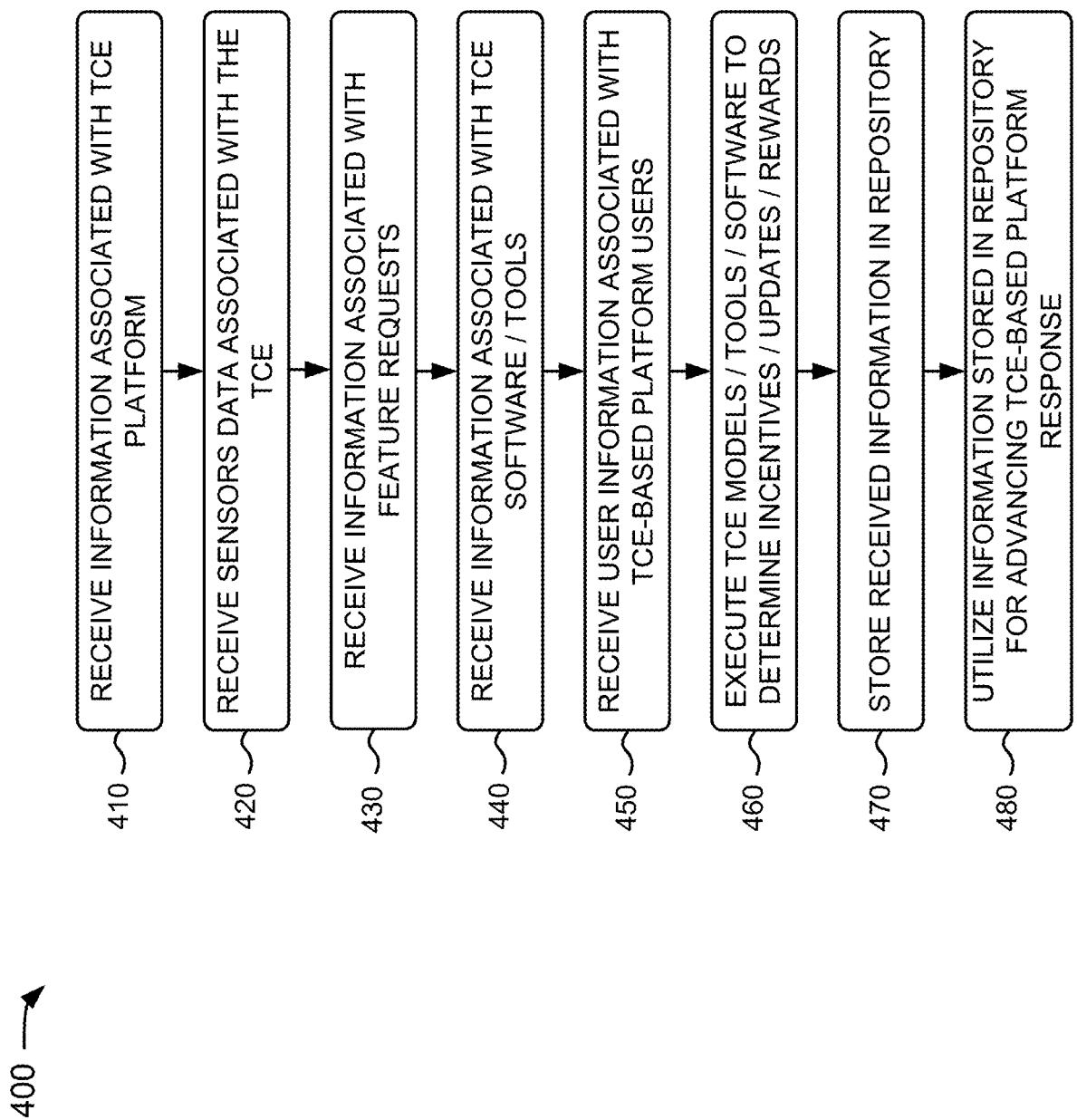
FIG. 4 is a flow chart of an example process for creating a technical computing environment (TCE)-based platform.

Referring now to FIG. 4, a flow chart of an example process 400 for creating TCE-based engine 225 is shown. In some implementations, process 400 may be performed by the standalone server device 220 and/or repository 230. In some implementations, process 400 may be performed by another device or a group of devices (e.g., server device 220/repository 230 of cloud computing environment 240) separate from or including the standalone server device 220/repository 230.

As shown in FIG. 4, process 400 may include receiving information associated with TCE models (block 410). For example, one or more developers may provide information associated with one or more TCE models to server device 220, and server device 220 may receive the TCE model(s) information. In some implementations, server device 220 may receive the TCE model(s) information from other sources, such as, for example, the Internet.

In some implementations, the TCE model(s) may include models created using the TCE; computational modeling, analysis, development, and/or simulation methods, techniques, methodologies, technologies, logic, engines, etc.; TCE models associated with, for example, embedded systems, cyber-physical systems, control systems, digital signal processing (DSP) systems, communications systems, image and video processing systems, FPGA design systems, test and measurement systems, geographic information systems, signal processing systems, etc.; TCE models associated with aerospace and defense, automotive, health and medicine, biotechnology and pharmaceutical, communications and telecommunication, electronics and semiconductors, robotics, energy production, financial services, industrial automation and machinery, chemistry, quantum computing, biology, architecture, computational music, biomechanics, human-computer interactions, material science, environmental and geoscience, nanotechnology, space and astronomy, social and human computation, entertainment, music, weather, etc.; etc. In some implementations, the information associated with the TCE model(s) may be combined together and/or integrated with other information, such as data, problems, tools, etc.

As further shown in FIG. 4, process 400 may include receiving data associated with the TCE (block 420). For example, one or more developers may provide data to server device 220, and server device 220 may receive the data. In some implementations, server device 220 may use crawlers to identify data on the Internet. A crawler is a program that exploits the link-based structure of the Internet to browse the Internet in a methodical, automated manner. A crawler may start with addresses (e.g., URLs) of links to visit. For each address on the list, the crawler may visit the document associated with the address. The crawler may identify outgoing links within the visited document and add addresses associated with these links to the list of addresses.

In some implementations, the data may include documents from the Internet that may provide useful information to TCE-based engine 225. For example, the data may include one or more web pages that provide results of execution of the TCE model(s), information relevant to the TCE model(s), results of execution of one or more TCE tools, information relevant to the TCE tool(s), etc. The data may also include TCE model(s), dynamic behavior of TCE model(s), architectural model(s), model design environment(s), etc.

As further shown in FIG. 4, process 400 may include receiving information associated with problems (block 430). For example, one or more developers may provide information associated with problems to server device 220, and server device 220 may receive the information. In some implementations, server device 220 may receive the problems information from other sources, such as, for example, the Internet. In some implementations, the problems may include problems, causes, verified causes, purposes, topics, challenges, subjects, questions, issues, areas of interest, etc. that developers may want to solve or partially solve using one or more of the TCE models. A verified cause may include a cause provided by an authorized developer, described below.

In some implementations, a new problem may be directly or indirectly related to an existing problem. For example, a first automotive problem may be related to adaptive cruise control (ACC) and a second automotive problem may be related to a model-based design method and/or problem. A third automotive problem may be directly related to an automotive engine and may be directly related to the first automotive problem and/or the second automotive problem. The third automotive problem may also be indirectly related to the model-based design method and/or the model-based design problem.

In some implementations, operating on a problem may be a collaborative effort between, for example, a selected set of developers (e.g., programmers, modelers, analysts, computational analysts, engineers, citizen scientists, students, etc.) using computational exploration and computational analysis mechanisms (e.g., simulation, prediction, assessment, modification, modeling, computational modeling, abstract analysis, etc.) that expedite collaborative and/or cooperative discovery of a solution to the problem.

Returning to FIG. 4, process 400 may include receiving information associated with tools (block 440). For example, one or more developers may provide information associated with one or more TCE tools to server device 220, and server device 220 may receive the information. In some implementations, server device 220 may receive the TCE tool(s) information from other sources, such as, for example, the Internet. In some implementations, the TCE tool(s) may include tools created using the TCE; simulation tools, technologies, techniques, methods, etc.; computational exploration, computational modeling, prediction, transformation, etc. tools; logic, notations, notions, source code, computational engines, etc. In some implementations, the tools may enable a set of actions (e.g., reading, editing, modifying, deleting, exchanging, simulating, etc.) to be performed on the TCE model(s). In some implementations, preinstalled tools may exist in the TCE, and developers may apply external tools to the preinstalled tools of the TCE.

In some implementations, the tools may include Caffe framework, CUDA framework, Torch, TensorFlow, DIGITS, Theano, Neon, IBM Deep Learning Stack, Intel MKL DNN stack, OriginLab, Comola, Simula, Modelica, Simulink®, Stateflow®, state-machines-based tools, LabView, National Instruments tools, Wolfram tools, Autodesk tools, SCADE tools, TargetLink, ASCET, Mentor Graphics tools, Vector, dSpace, Polyspace, hardware-related tools (e.g., xPC Target), Dymola, Mathematica, Unified Modeling Language (UML) tools, SysML tools, Eclipse Foundation tools, ASCEND, Facsimile, Galatea, GarlicSim, NS2, Physics Abstraction Layer, SimPy, Tortuga, Ptolemy-related development tools, Adaptive Communication Environment (ACE) tools, Automated Model Compiler (AMC), CheckMate Design Space Exploration Tool (DESERT), Generic Modeling Environment (GME), Graph Rewrite And Transformation (GReAT) tool, PTOLEMY II SPP, Universal Data Model (UDM), Web-based Open Tool Integration Framework (WOTIF), CTE/ES, Embedded Validator, MEval, MTest, PROVE-tech, Reactis Tester, Reactis Validator, Safety Checker Blockset, Safety Test Builder, Simulink® Validation and Verification™, Simulink® Design Verifier™, System Test™, Auto-Focus, Time Partitioning Testing, T-VEC Tester for Simulink, JUMBL, MaTeLo, MATT, MiLEST, etc.

As further shown in FIG. 4, process 400 may include receiving information associated with device users (block 450). For example, server device 220 may receive user information associated with device users that provide data, requests, and/or assets to TCE-based engine 225. In some implementations, server device 220 may employ a system to retrieve the user information from existing resources that are provided by the device users or permitted by the device users to be retrieved. In some implementations, the user information may include personal information associated with the device users (e.g., digital identities, social network information, address information, demographic information, etc.); profile information associated with the device users; location information associated with the device users (e.g., geographical location information, location information associated with user logins, etc.); etc.

In some implementations, the device users may initiate and/or manipulate (e.g., enter, input, modify, delete, share, etc.) the user profile information; may maintain user manipulation activities; etc. In some implementations, the user information may relate users based on geographical proximity, may relate users based on skill sets possessed by the users, may relate users and/or other information received by server device 220 using a skill proximity analysis, etc. The skill proximity analysis may include a mechanism that compares different social, professional, and/or other skills, and prioritizes the skills so that users and/or the other information received by server device 220 may be related to each other and located and/or selected based on the skill proximity analysis.

Returning to FIG. 4, process 400 may include executing the device-user-based data, TCE-based engine model(s) and the TCE tool(s) to determine and/or utilize behavior information associated with the TCE model(s) and the TCE tool(s) (block 460). For example, server device 220 may utilize the TCE to execute the TCE model(s) and/or the TCE tool(s). Execution of the TCE model(s) may generate behavior information associated with the TCE model(s). The behavior information may include, for example, outputs of the TCE model(s), accuracies of the TCE model(s), errors associated with the TCE model(s), efficiencies of the TCE model(s), execution times of the TCE model(s), etc. In some implementations, execution of the TCE tool(s) may generate behavior information associated with the TCE tool(s). The behavior information may include, for example, outputs of the TCE tool(s), accuracies of the TCE tool(s), errors associated with the TCE tool(s), efficiencies of the TCE tool(s), execution times of the TCE tool(s), etc.

As further shown in FIG. 4, process 400 may include storing the received information and the behavior information in a repository (block 470). For example, server device 220 may store the TCE model(s) information, the data, requests, scenarios, features, the problems information, the TCE tool(s) information, and/or the behavior information associated with the TCE model(s)/TCE tool(s) in repository 230. In some implementations, server device 220 may integrate, combine, etc. one or more portions of the information before storing the information in repository 230. In some implementations, server device 220 may store the TCE model(s) information, the data, the problems information, the TCE tool(s) information, and/or the behavior information in separate data structures (e.g., databases) of repository 230. In some implementations, the information stored in repository 230 may include one or more data storage formats. The data storage format may depend on the amount, size, and complexity of the information stored in repository 230.

Returning to FIG. 4, process 400 may include utilizing the information stored in the repository for a TCE-based engine (block 480). For example, server device 220 may utilize the information stored in repository 230 for TCE-based engine 225. In some implementations, TCE-based engine 225 may compare information requested by a device user to the information stored in repository 230, and may select information from repository 230 based on the comparison. For example, TCE-based engine 225 may select one or more TCE models from repository 230, and may use the selected TCE model(s) to generate an answer to the device user request.

In some implementations, TCE-based engine 225 may be utilized by developers and/or any type of users (e.g., including artificial-intelligence agents) for research and science collaboration, engineering collaboration, development collaboration, simulation collaboration, prediction collaboration, analysis and transformation collaboration, cause analysis, interpretation assessment, mass-scale collaboration, etc. Collaboration may include activities such as, for example, analyzing, simulating, predicting, assessing, modifying, modeling, abstracting, etc. a search query to predict or assess query issues and/or to make decisions based on the search query. Collaboration may include a developer participating in providing a solution within TCE-based engine 225.

In some implementations, application of TCE-based engine 225 may be utilized for online marketing, data calibration, data optimization, pay-per-click management solutions, simulation optimization, hardware optimization, user incentive provision, algorithms acceleration, etc. TCE-based engine 225 may provide a one-click solution, to device users, that may reduce a number of steps required to receive a response (e.g., a dedicated software update). TCE-based engine 225 may limit a number of tools, plugins, and/or other computing functionality that has to be installed to enable users to use TCE-based engine 225.

In some implementations, device users and/or developers may access TCE-based engine 225 using different schemes, such as, for example, anonymously, based on predefined subscription criteria (e.g., a free membership, a premium membership, a privileged membership, a per-use basis, a monthly subscription, a subscription based on performance, a subscription based on merit, a subscription based on reputation, a subscription based on affiliation, etc.), and/or based on other criteria (e.g., merit, reputation, etc.).

In an embodiment, a device user and/or a consumer may be enabled to report about the features for autonomous driving that may constitute the market demand. Such a report may be evaluated and occurrence of each new feature suggestion may be counted and stored by the TCE-based engine.

In an embodiment, a device user and/or a consumer may be enabled to perform crowd-testing, safety scenarios evaluation, crowd-validation, crowd-verification, and/or crowd-based quality assurance processes. These processes may be performed automatically, semi-automatically, and/or manually using the TCE-based platform user interface. The automation grade may be achieved through the means of artificial intelligence, algorithms optimization, and/or simulation.

In an embodiment, the semantics of safety may comprise public safety, autonomous devices safety, and/or safety software. The validation of the implementation for each of these safeties may be performed using integration test, scenario-based test, driver-request based test, driver behavior test, and/or unrealistic scenario (i.e., outside boundaries) test available only in virtual reality.

Figure 5A:
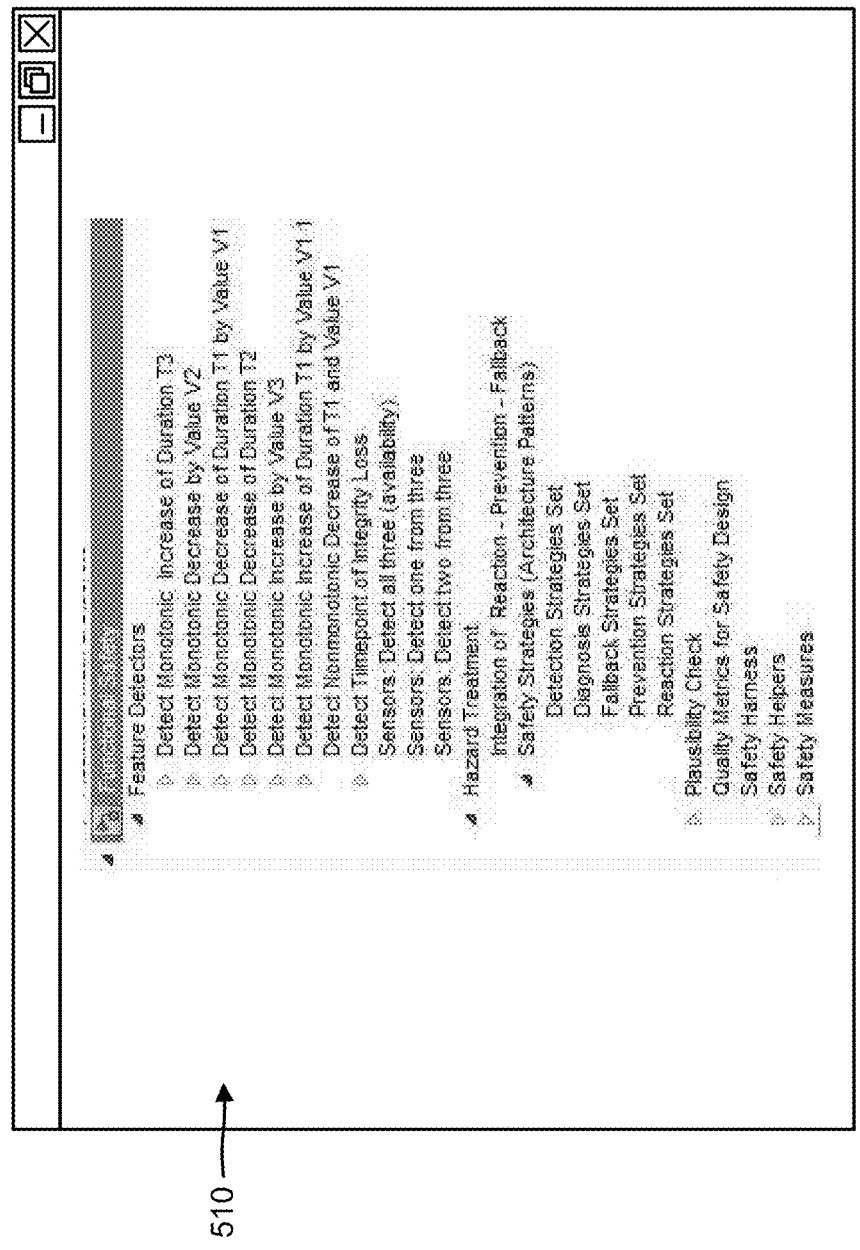
FIGS. 5A-5D are diagrams of an example of the process described in connection with FIG. 4.
Figure 5B:
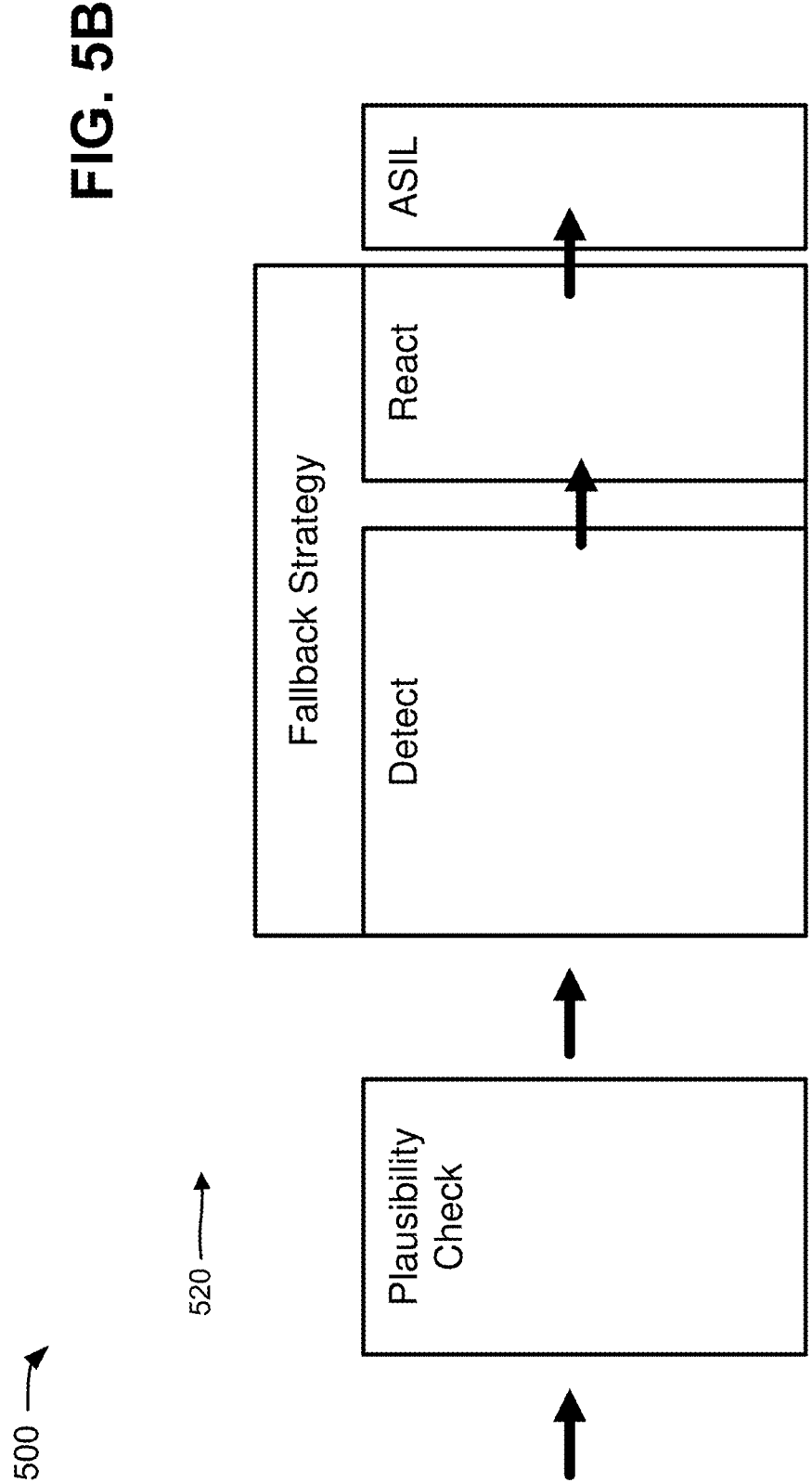

In an embodiment, a safety library, tool, toolset, blockset, toolbox and/or a test library, tool, toolset, blockset, toolbox may be used for automatically and/or semi-automatically designing such scenarios. An example of a safety library, tool, toolset, blockset, toolbox is shown in FIG. 5A. FIG. 5B depicts an example of a software safety pattern that may be automatically generated by the tool of FIG. 5A. The execution of the designed scenarios may be performed using the TCE-based platform as indicated in FIG. 1.

In an embodiment, a safety library, tool, toolset, blockset, toolbox shown in FIG. 5A may enable building and executing an executable safety design, safety monitoring, safety measures, and fallback strategy based on ISO26262 and/or beyond this standard. A safety library, tool, toolset, blockset, toolbox may close the gap of building the system safety design and its execution at the same time.

The features may include system-level safety monitoring (SW, HW, network), fault detection patterns, safety measures patterns, fallback strategies (e.g., detect-react, prevent, mitigate, add redundancy, etc.), automated Automotive Safety Integrity Level (ASIL) assignment, execution at Model-in-the Loop level (i.e., receiving instant results), metrics to measure the quality of safety mechanisms, auto-generation of Technical Safety Concept document (as required by ISO26262 and/or other related standards and/or upcoming rules/guidelines (e.g., United States National Highway Traffic Safety Administration (NHTSA) and such)), adding system architecture features, and/or Software-in-the Loop level Hardware-in-the Loop, Processor-in-the Loop, ECU-in-the Loop capabilities.

In an embodiment a safety library, tool, toolset, blockset, toolbox may be customized for other industries, such as, automotive, robotics, aerospace, medical devices, microprocessors.

In an embodiment, a TCE-based platform may include a TCE-based engine and/or TCE-based framework dedicated for developer and/or for the device user. The device user and/or community may request new algorithms/methods and/or specify the requirements for new features and/or functionalities. The device user may test, validate, and/or verify the added, modified, downgraded, and/or updated system, software, and/or implementation. The device user may apply safety means to assure/certify safety of the system, software, and/or implementation and updates (including downgrades) thereof. The device user may treat these practices as an own asset to trade using the TCE-based platform. The developer may add algorithms, system, software, and/or implementation and make them an own asset to trade using the TCE-based platform. The TCE-based platform may incentivize the community for providing an asset. The incentives may include a bonus, points, financial reward, free features updates, active safety of the system updates, software, safety, and/or other rewards. The TCE-based platform may enable the TCE-based engine (or the other way around) to track and store the performance of the newly added updates. The TCE-based platform may enable the TCE-based engine (or the other way around) to track the requirements with relation to the user's response to the algorithm. The TCE-based engine may use model-based design for any of the above activities, it may use AI and/or machine learning and/or deep learning, and/or it may merge the methods within model-based design and machine learning areas and/or any other methods in any possible combination when required.

In an embodiment, a device user may be involved in testing the device. For example, the device user may be testing a semi-autonomous and/or other car. A test like this may be a categorized as a crowd-test if multiple users perform it. A test may include driving in a combination of conditions, such as, night and day, rain, snow, other difficult weather conditions, providing unanticipated objects on the road, static and moving objects (including non-typical moving patterns), putting a humanoid on the road (with the silhouette of a human, child, male, female, elderly, elderly with additional equipment, etc.), providing dynamically changing traffic signs, providing a fleet of multiple vehicles (autonomous and traditional cars) to the testbed, providing other vehicles (drones, fixed wings, planes, trams, trains, railway vehicles, hyperloops) to the testbed, providing simulation data of weather hazardous circumstances (e.g., serious fog, tornado, earthquake, flood, etc.), and/or using scenarios in augmented reality.

In an embodiment, a device user and/or a developer may create own assets based on own interaction with the device using the TCE-based platform. For example, if the device user and/or a developer performs an evaluation of a car through the TCE-based platform, the device user and/or a developer may investigate, assess, and/or be provided with assessment means for studying at least one challenge. The challenges pool may include answering at least one of the questions: What kind of methodology was used to develop the autonomous functionalities? What methodology was used to support the quality assurance? How did test methodology and safety methodology converge? What were the metrics used to assess the maturity of the produced system? Was a merge of the design of the embedded system (causality) with the location data (correlation) performed? What type of data were considered? Was simulation in real time applied? How is the Technology Readiness Level evaluated? How systematic was the development process and how systematic was the quality assurance process? What type of safety mechanisms are implemented? How effectively is it working? How is this effectiveness measured? Is the development of the vehicle compliant to the currently valid standard? What standard is it? Is it ISO26262 or something else? Which authority reviewed this compliance? What type of testing was applied? What is an example of a test case/test case suite? How is this example linked to the requirements? How systematic is this process? How was test coverage measured? Who and how is specifying and refining the requirements? Who is extracting the safety requirements and how is this process performed? How are they tracked down to the implementation? What is the coverage and completeness of the Functional Safety Concept and Technical Safety Concept documents? How do these documents relate to the design and implementation? How this relation be proven? How comprehensive is the safety concept? How is this comprehensiveness measured? What languages were used to develop the quality assurance (including safety)? What tools were used? Where they qualified? By which organizations? What safety measures are applied and implemented? Are there tests that could identify correct operation/functioning of the safety measures themselves? In other words, how are the tests of the safety mechanisms (and not of the system) performed? How are the signals qualified? Is Automotive Safety Integrity Level (ASIL) enough for autonomous cars? Why and why not? How is the process of qualification measured? What new and different security concerns arise and why? Electric car versus traditional car: how is the technology influencing the intrinsic software safety in a car?

Figure 5C:
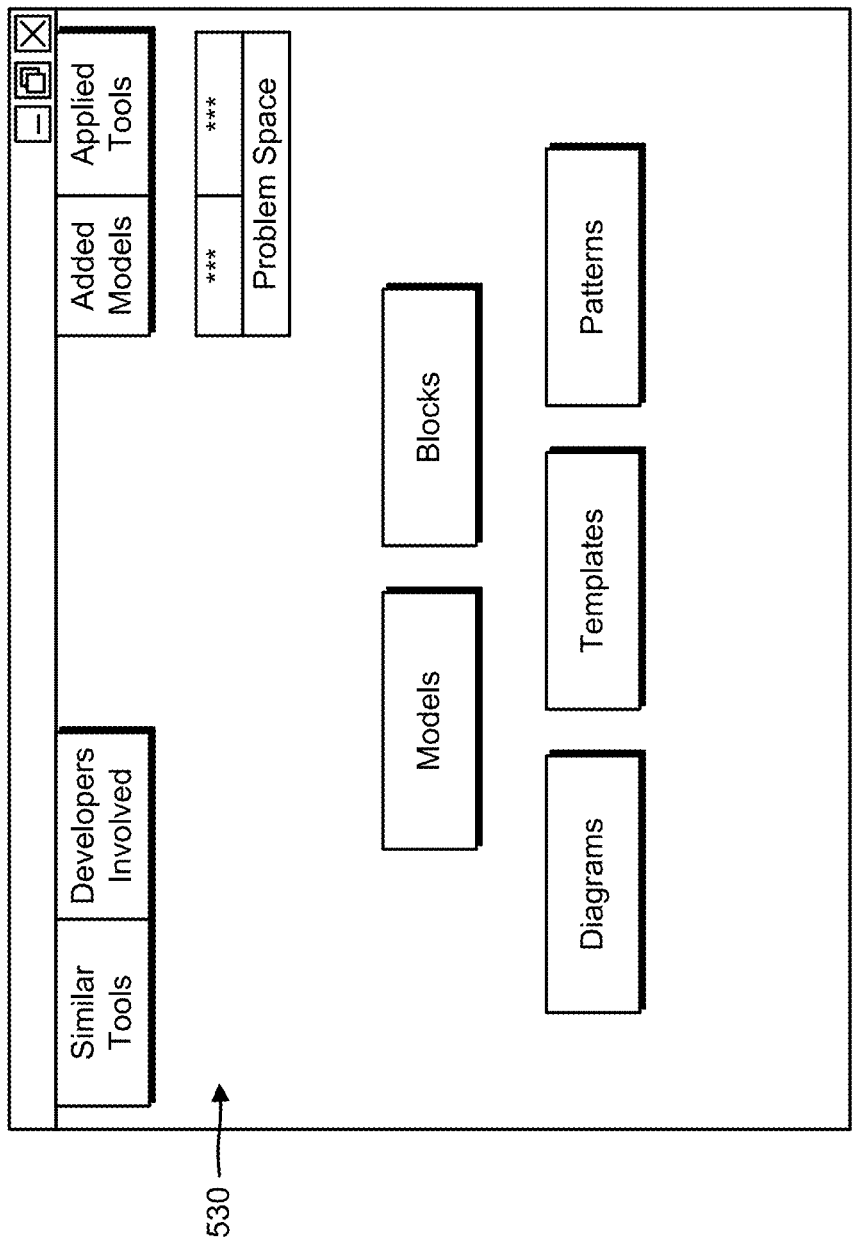
Figure 5D:
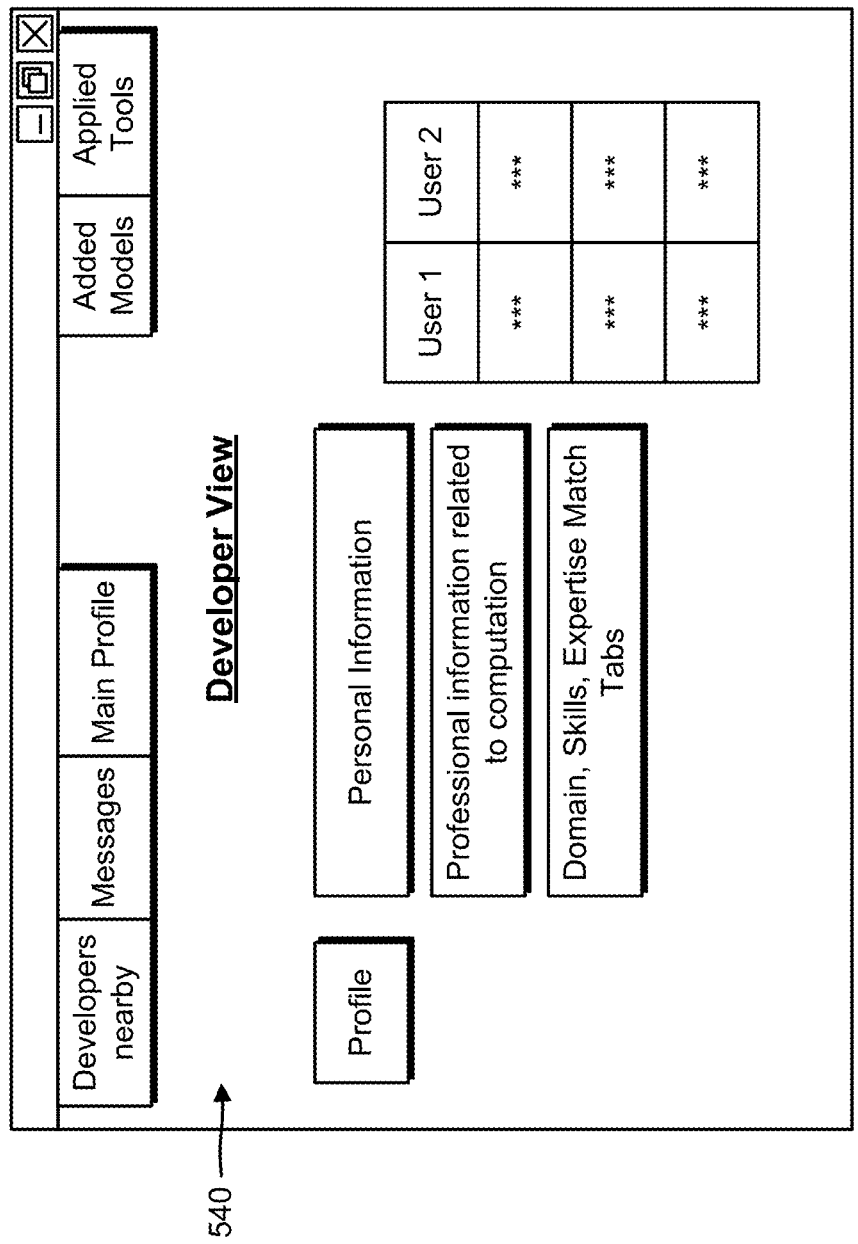

Referring now to FIGS. 5C and 5D, diagram 500 illustrates various user interfaces for a TCE-based platform. FIG. 5C illustrates a user interface 530. FIG. 5D illustrates a user interface 540, including a developer view.

Referring now to FIG. 6, a flow chart of an example process 600 for transforming a feature request of a device user into a format understood by the TCE-based engine 225 is shown. In some implementations, process 600 may be performed by the standalone server device 220 and/or repository 230. In some implementations, process 600 may be performed by another device or a group of devices (e.g., server device 220/repository 230 of cloud computing environment 240) separate from or including the standalone server device 220/repository 230.

As shown in FIG. 6, process 600 may include providing for display of a TCE-based engine 225 user interface (block 610). Process 600 may include receiving a request from a device user via the TCE-based engine 225 user interface (block 620). Process 600 may include dividing the request into one or more request elements (block 630). Process 600 may include processing the one or more request elements based on request content and/or a requested feature (block 640). Process 600 may include transforming the request into another request, understood by the TCE-based engine 225, based on the processed request elements (block 650). Process 600 may include providing the other request (i.e., the transformed request) to the TCE-based engine 225 (block 660).

Referring now to FIG. 7, a flow chart of an example process 700 for providing a software update to a feature request using the TCE-based engine 225 is shown. In some implementations, process 700 may be performed by the standalone server device 220 and/or repository 230. In some implementations, process 700 may be performed by another device or a group of devices (e.g., server device 220/repository 230 of cloud computing environment 240) separate from or including the standalone server device 220/repository 230.

As shown in FIG. 7, process 700 may include receiving a request understood by the TCE-based engine 225 (block 710). Process 700 may include determining information requested in the request (block 720). Process 700 may include selecting one or more TCE models and/or software elements from the repository 230 based on the information requested by the request (block 730). Process 700 may include providing the information requested by the request to the selected TCE models and/or software elements (block 740). Process 700 may include updating the selected TCE models and/or software elements (or letting the selected TCE models and/or software elements be updated) based on the information to generate an update for the request (block 750). Process 700 may include providing for display of the update to the request (block 760).

Referring now to FIGS. 8A-8C, diagram 800 illustrates various examples of the process described in connection with FIG. 7. FIG. 8A illustrates a request 810 that is transformed into a request 820 that is provided to the TCE-based engine 225. FIG. 8B illustrates a user interface 830, and FIG. 8C illustrates a user interface 840.

EXAMPLES

Illustrative examples of the technologies disclosed herein are provided below. An embodiment of the technologies may include any one or more, and any combination of, the examples described below.

Example 1 includes a computing device for crowd-sourced update and validation, the computing device comprising a technical computing environment-based engine to: receive user information from one or more user devices; execute a technical computing environment model with the user information to generate behavior data of the technical computing environment model; generate a software update for the technical computing environment model based on the behavior data of the technical computing environment model; and transmit an incentive to the one or more user devices in response to generation of the software update.

Example 2 includes the subject matter of Example 1, and wherein the user information comprises sensor data.

Example 3 includes the subject matter of any of Examples 1 and 2, and wherein the sensor data comprises distance detection sensor data.

Example 4 includes the subject matter of any of Examples 1-3, and wherein the incentive comprises the software update.

Example 5 includes the subject matter of any of Examples 1-4, and wherein the incentive comprises a software feature update.

Example 6 includes the subject matter of any of Examples 1-5, and wherein the incentive comprises a safety software update.

Example 7 includes the subject matter of any of Examples 1-6, and wherein: the technical computing environment-based engine is further to receive, from one or more developer devices, information associated with the technical computing environment model; and to execute the technical computing environment model with the user information comprises to execute the technical computing environment model in response to receipt of the information associated with the technical computing environment model.

Example 8 includes the subject matter of any of Examples 1-7, and wherein the information associated with the technical computing environment model comprises problem information.

Example 9 includes the subject matter of any of Examples 1-8, and wherein the information associated with the technical computing environment model comprises a technical computing environment tool.

Example 10 includes the subject matter of any of Examples 1-9, and further comprising a repository to store the behavior data.

Example 11 includes the subject matter of any of Examples 1-10, and wherein: the technical computing environment-based engine is further to select the technical computing environment model from the repository based on the user information; and to execute the technical computing environment model comprises to execute the technical computing environment model in response to selection of the technical computing environment model.

Example 12 includes the subject matter of any of Examples 1-11, and wherein to receive the user information comprises to receive a user request, wherein the user request requests information.

Example 13 includes the subject matter of any of Examples 1-12, and wherein the technical computing environment-based engine is further to: determine the information requested by the user request; and select the technical computing environment model based on the information requested by the user request; wherein to execute the technical computing environment model further comprises to execute the technical computing environment with the information requested by the user request in response to selection of the technical computing environment model.

Example 14 includes the subject matter of any of Examples 1-13, and further comprising a technical computing environment-based engine user interface to: divide the user request into one or more request elements, wherein the one or more request elements comprise a feature request; process the one or more request elements; and transform the user request into a second request in response to processing of the one or more request elements; wherein to execute the technical computing environment model further comprises to execute the technical computing environment model with the second request.

Example 15 includes the subject matter of any of Examples 1-14, and wherein to receive the user information comprises to receive the user request via the technical computing environment-based engine user interface.

Example 16 includes the subject matter of any of Examples 1-15, and wherein the technical computing environment model comprises a model of an autonomous system, the software update comprises a safety update for the autonomous system, and the incentive comprises a safety update for the autonomous system.

Example 17 includes the subject matter of any of Examples 1-16, and wherein the autonomous system comprises a self-driving vehicle.

Example 18 includes a method for crowd-sourced update and validation, the method comprising: receiving, by a computing device, user information from one or more user devices; executing, by the computing device, a technical computing environment model with the user information to generate behavior data of the technical computing environment model; generating, by the computing device, a software update for the technical computing environment model based on the behavior data of the technical computing environment model; and transmitting, by the computing device, an incentive to the one or more user devices in response to generating the software update.

Example 19 includes the subject matter of Example 18, and wherein receiving the user information comprises receiving sensor data.

Example 20 includes the subject matter of any of Examples 18 and 19, and wherein the sensor data comprises distance detection sensor data.

Example 21 includes the subject matter of any of Examples 18-20, and wherein transmitting the incentive comprises transmitting the software update.

Example 22 includes the subject matter of any of Examples 18-21, and wherein transmitting the incentive comprises transmitting a software feature update to the one or more user devices.

Example 23 includes the subject matter of any of Examples 18-22, and wherein transmitting the incentive comprises transmitting a safety software update.

Example 24 includes the subject matter of any of Examples 18-23, and further comprising: receiving, from one or more developer devices, information associated with the technical computing environment model; wherein executing the technical computing environment model with the user information comprises executing the technical computing environment model in response to receiving the information associated with the technical computing environment model.

Example 25 includes the subject matter of any of Examples 18-24, and wherein receiving the information associated with the technical computing environment model comprises receiving problem information.

Example 26 includes the subject matter of any of Examples 18-25, and wherein receiving the information associated with the technical computing environment model comprises receiving a technical computing environment tool.

Example 27 includes the subject matter of any of Examples 18-26, and further comprising storing, by the computing device, the behavior data in a repository.

Example 28 includes the subject matter of any of Examples 18-27, and further comprising: selecting, by the computing device, the technical computing environment model from the repository based on the user information; wherein executing the technical computing environment model comprises executing the technical computing environment model in response to selecting the technical computing environment model.

Example 29 includes the subject matter of any of Examples 18-28, and wherein receiving the user information comprises receiving a user request, wherein the user request requests information.

Example 30 includes the subject matter of any of Examples 18-29, and further comprising: determining, by the computing device, the information requested by the user request; and selecting, by the computing device, the technical computing environment model based on the information requested by the user request; wherein executing the technical computing environment model further comprises executing the technical computing environment with the information requested by the user request in response to selecting the technical computing environment model.

Example 31 includes the subject matter of any of Examples 18-30, and further comprising: dividing, by the computing device, the user request into one or more request elements, wherein the one or more request elements comprise a feature request; processing, by the computing device, the one or more request elements; and transforming, by the computing device, the user request into a second request in response to processing the one or more request elements; wherein executing the technical computing environment model further comprises executing the technical computing environment model with the second request.

Example 32 includes the subject matter of any of Examples 18-31, and wherein receiving the user information comprises receiving the user request via a technical computing environment-based engine user interface.

Example 33 includes the subject matter of any of Examples 18-32, and wherein: executing the technical computing environment model comprises executing a model of an autonomous system; generating the software update comprises generating a safety update for the autonomous system; and transmitting the incentive to the one or more user devices comprises transmitting the safety update for the autonomous system to the one or more user devices.

Example 34 includes the subject matter of any of Examples 18-33, and wherein the autonomous system comprises a self-driving vehicle.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for crowd-sourced update and validation, the computing device comprising: means for receiving user information from one or more user devices; means for executing a technical computing environment model with the user information to generate behavior data of the technical computing environment model; means for generating a software update for the technical computing environment model based on the behavior data of the technical computing environment model; and means for transmitting an incentive to the one or more user devices in response to generating the software update.

Example 39 includes the subject matter of Example 38, and wherein the means for receiving the user information comprises means for receiving sensor data.

Example 40 includes the subject matter of any of Examples 38 and 39, and wherein the sensor data comprises distance detection sensor data.

Example 41 includes the subject matter of any of Examples 38-40, and wherein the means for transmitting the incentive comprises means for transmitting the software update.

Example 42 includes the subject matter of any of Examples 38-41, and wherein the means for transmitting the incentive comprises means for transmitting a software feature update to the one or more user devices.

Example 43 includes the subject matter of any of Examples 38-42, and wherein the means for transmitting the incentive comprises means for transmitting a safety software update.

Example 44 includes the subject matter of any of Examples 38-43, and further comprising: means for receiving, from one or more developer devices, information associated with the technical computing environment model; wherein the means for executing the technical computing environment model with the user information comprises means for executing the technical computing environment model in response to receiving the information associated with the technical computing environment model.

Example 45 includes the subject matter of any of Examples 38-44, and wherein the means for receiving the information associated with the technical computing environment model comprises means for receiving problem information.

Example 46 includes the subject matter of any of Examples 38-45, and wherein the means for receiving the information associated with the technical computing environment model comprises means for receiving a technical computing environment tool.

Example 47 includes the subject matter of any of Examples 38-46, and further comprising means for storing the behavior data in a repository.

Example 48 includes the subject matter of any of Examples 38-47, and further comprising: means for selecting the technical computing environment model from the repository based on the user information; wherein the means for executing the technical computing environment model comprises means for executing the technical computing environment model in response to selecting the technical computing environment model.

Example 49 includes the subject matter of any of Examples 38-48, and wherein the means for receiving the user information comprises means for receiving a user request, wherein the user request requests information.

Example 50 includes the subject matter of any of Examples 38-49, and further comprising: means for determining the information requested by the user request; and means for selecting the technical computing environment model based on the information requested by the user request; wherein the means for executing the technical computing environment model further comprises means for executing the technical computing environment with the information requested by the user request in response to selecting the technical computing environment model.

Example 51 includes the subject matter of any of Examples 38-50, and further comprising: means for dividing the user request into one or more request elements, wherein the one or more request elements comprise a feature request; means for processing the one or more request elements; and means for transforming the user request into a second request in response to processing the one or more request elements; wherein the means for executing the technical computing environment model further comprises means for executing the technical computing environment model with the second request.

Example 52 includes the subject matter of any of Examples 38-51, and wherein the means for receiving the user information comprises means for receiving the user request via a technical computing environment-based engine user interface.

Example 53 includes the subject matter of any of Examples 38-52, and wherein: the means for executing the technical computing environment model comprises means for executing a model of an autonomous system; the means for generating the software update comprises means for generating a safety update for the autonomous system; and the means for transmitting the incentive to the one or more user devices comprises means for transmitting the safety update for the autonomous system to the one or more user devices.

Example 54 includes the subject matter of any of Examples 38-53, and wherein the autonomous system comprises a self-driving vehicle.

The invention claimed is:

1. A computing device for crowd-sourced update and validation, the computing device comprising a technical computing environment-based engine to:
   receive user information from one or more user devices, wherein to receive the user information comprises to receive a user request, wherein the user request requests information;
   determine the information requested by the user request;
   select a technical computing environment model based on the information requested by the user request;
   execute the technical computing environment model within a technical computing environment with the user information to generate behavior data of the technical computing environment model, wherein the technical computing environment comprises a dynamically typed array-based programming language, and wherein to execute the technical computing environment model further comprises to execute the technical computing environment model with the information requested by the user request in response to selection of the technical computing environment model;
   generate a software update for the technical computing environment model based on the behavior data of the technical computing environment model; and
   transmit an incentive to the one or more user devices in response to generation of the software update.

2. The computing device of claim 1, wherein the user information comprises sensor data.

3. The computing device of claim 2, wherein the sensor data comprises distance detection sensor data.

4. The computing device of claim 1, wherein the incentive comprises the software update.

5. The computing device of claim 1, wherein the incentive comprises a safety software update.

6. The computing device of claim 1, wherein:
   the technical computing environment-based engine is further to receive, from one or more developer devices, information associated with the technical computing environment model; and
   to execute the technical computing environment model with the user information comprises to execute the technical computing environment model in response to receipt of the information associated with the technical computing environment model.

7. The computing device of claim 1, further comprising a repository to store the behavior data.

8. The computing device of claim 7, wherein:
   the technical computing environment-based engine is further to select the technical computing environment model from the repository based on the user information; and
   to execute the technical computing environment model comprises to execute the technical computing environment model in response to selection of the technical computing environment model.

9. The computing device of claim 1, further comprising a technical computing environment-based engine user interface to:
   divide the user request into one or more request elements, wherein the one or more request elements comprise a feature request;
   process the one or more request elements; and
   transform the user request into a second request in response to processing of the one or more request elements;
   wherein to execute the technical computing environment model further comprises to execute the technical computing environment model with the second request.

10. The computing device of claim 1, wherein the technical computing environment model comprises a model of an autonomous system, the software update comprises a safety update for the autonomous system, and the incentive comprises a safety update for the autonomous system.

11. The computing device of claim 10, wherein the autonomous system comprises a self-driving vehicle.

12. A method for crowd-sourced update and validation, the method comprising:
   receiving, by a computing device, user information from one or more user devices wherein receiving the user information comprises receiving a user request, wherein the user request requests information;
   determining, by the computing device, the information requested by the user request;
   selecting, by the computing device, a technical computing environment model based on the information requested by the user request;
   executing, by the computing device, the technical computing environment model within a technical computing environment with the user information to generate behavior data of the technical computing environment model, wherein the technical computing environment comprises a dynamically typed array-based programming language, and wherein executing the technical computing environment model further comprises executing the technical computing environment model with the information requested by the user request in response to selecting the technical computing environment model;
   generating, by the computing device, a software update for the technical computing environment model based on the behavior data of the technical computing environment model; and
   transmitting, by the computing device, an incentive to the one or more user devices in response to generating the software update.

13. The method of claim 12, wherein receiving the user information comprises receiving sensor data.

14. The method of claim 12, wherein transmitting the incentive comprises transmitting the software update.

15. The method of claim 12, wherein transmitting the incentive comprises transmitting a safety software update.

16. The method of claim 12, wherein:
   executing the technical computing environment model comprises executing a model of an autonomous system;
   generating the software update comprises generating a safety update for the autonomous system; and
   transmitting the incentive to the one or more user devices comprises transmitting the safety update for the autonomous system to the one or more user devices.

17. The method of claim 16, wherein the autonomous system comprises a self-driving vehicle.

18. One or more non-transitory, computer-readable storage media comprising a plurality of instructions that in response to being executed cause a computing device to:
   receive user information from one or more user device, wherein to receive the user information comprises to receive a user request, wherein the user request requests information;
   determine the information requested by the user request;

select a technical computing environment model based on the information requested by the user request;

execute the technical computing environment model within a technical computing environment with the user information to generate behavior data of the technical computing environment model, wherein the technical computing environment comprises a dynamically typed array-based programming language, and wherein to execute the technical computing environment model further comprises to execute the technical computing environment model with the information requested by the user request in response to selecting the technical computing environment model;

generate a software update for the technical computing environment model based on the behavior data of the technical computing environment model; and transmit an incentive to the one or more user devices in response to generating the software update.

19. The one or more non-transitory, computer-readable storage media of claim 18, wherein to receive the user information comprises to receive sensor data.

20. The one or more non-transitory, computer-readable storage media of claim 18, wherein to transmit the incentive comprises to transmit the software update.

21. The one or more non-transitory, computer-readable storage media of claim 18, wherein to transmit the incentive comprises to transmit a safety software update.

22. The one or more non-transitory, computer-readable storage media of claim 18, wherein:

to execute the technical computing environment model comprises to execute a model of an autonomous system;

to generate the software update comprises to generate a safety update for the autonomous system; and to transmit the incentive to the one or more user devices comprises to transmit the safety update for the autonomous system to the one or more user devices.

23. The one or more non-transitory, computer-readable storage media of claim 22, wherein the autonomous system comprises a self-driving vehicle.

* * * * *